July 30, 1935.  J. D. CAMPBELL  2,009,574
ROTARY DRUM BRAKE
Filed April 25, 1930   3 Sheets-Sheet 1
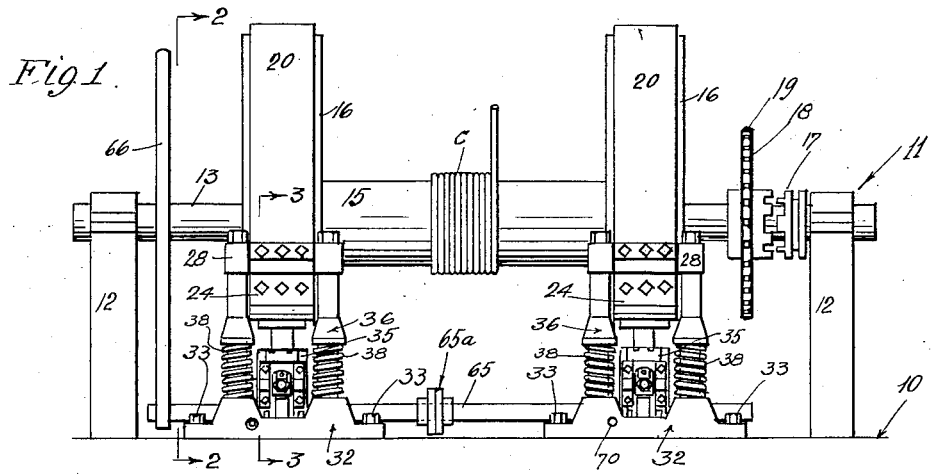
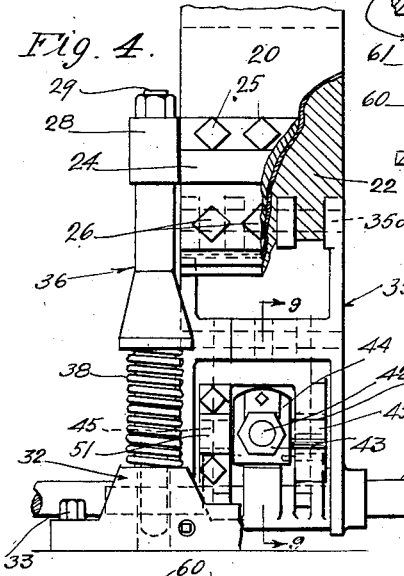
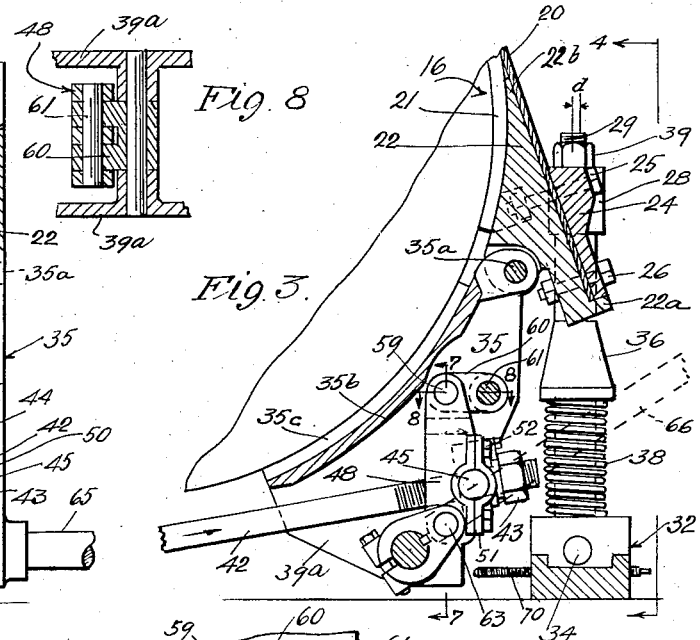
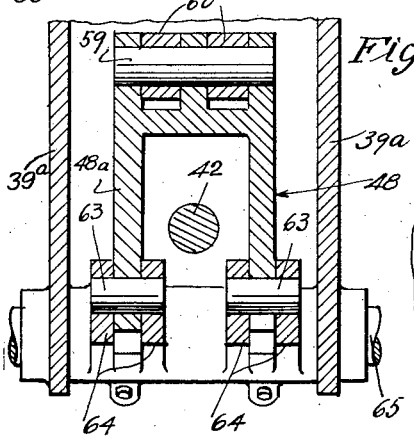
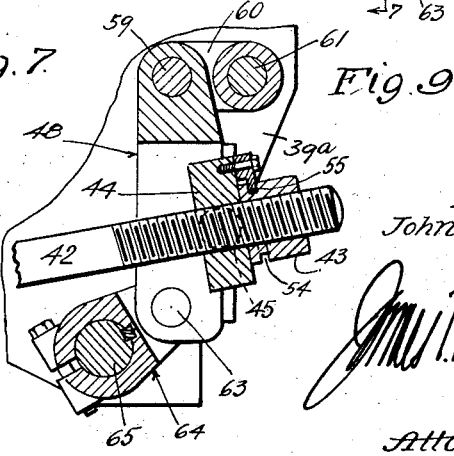
Inventor.
John D. Campbell.
Attorney.

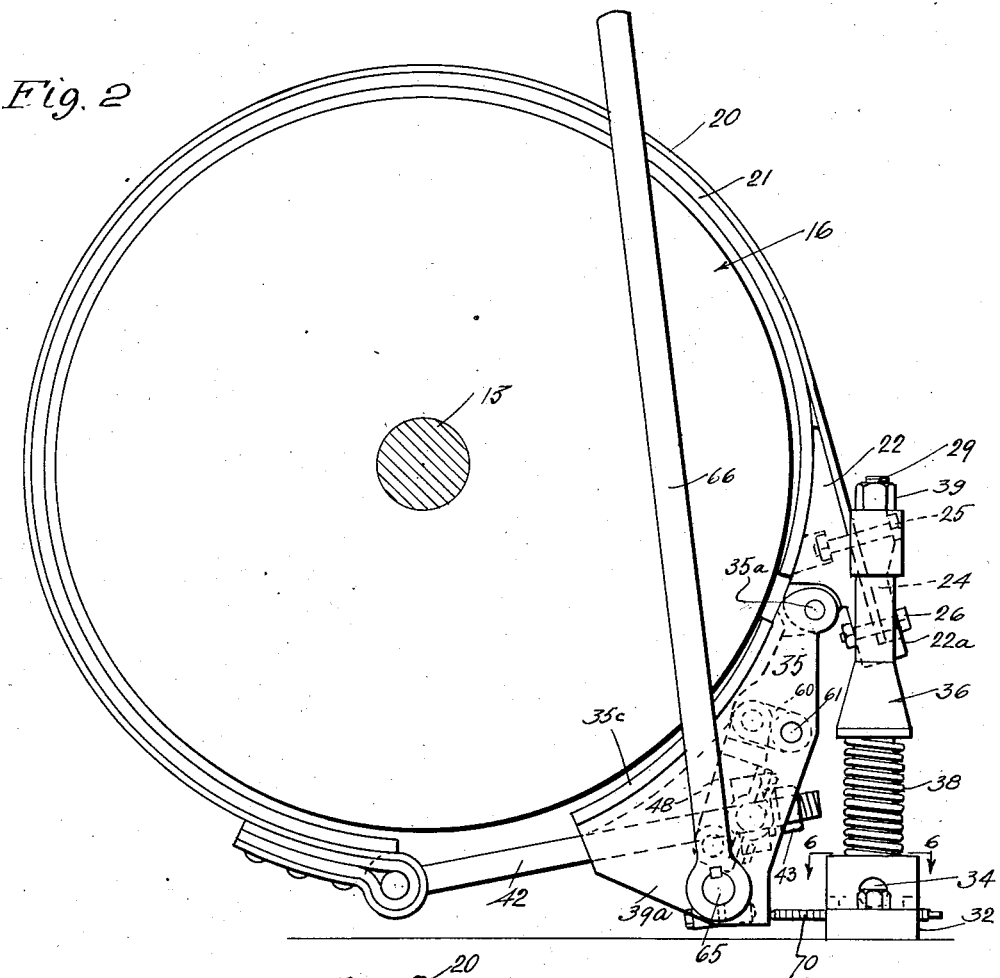
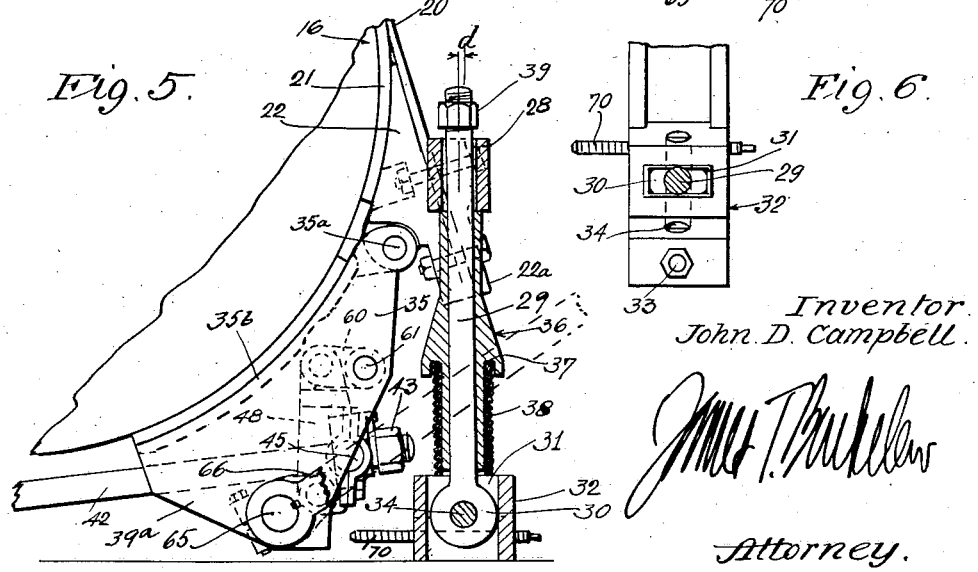

July 30, 1935. J. D. CAMPBELL 2,009,574
ROTARY DRUM BRAKE
Filed April 25, 1930 3 Sheets-Sheet 3
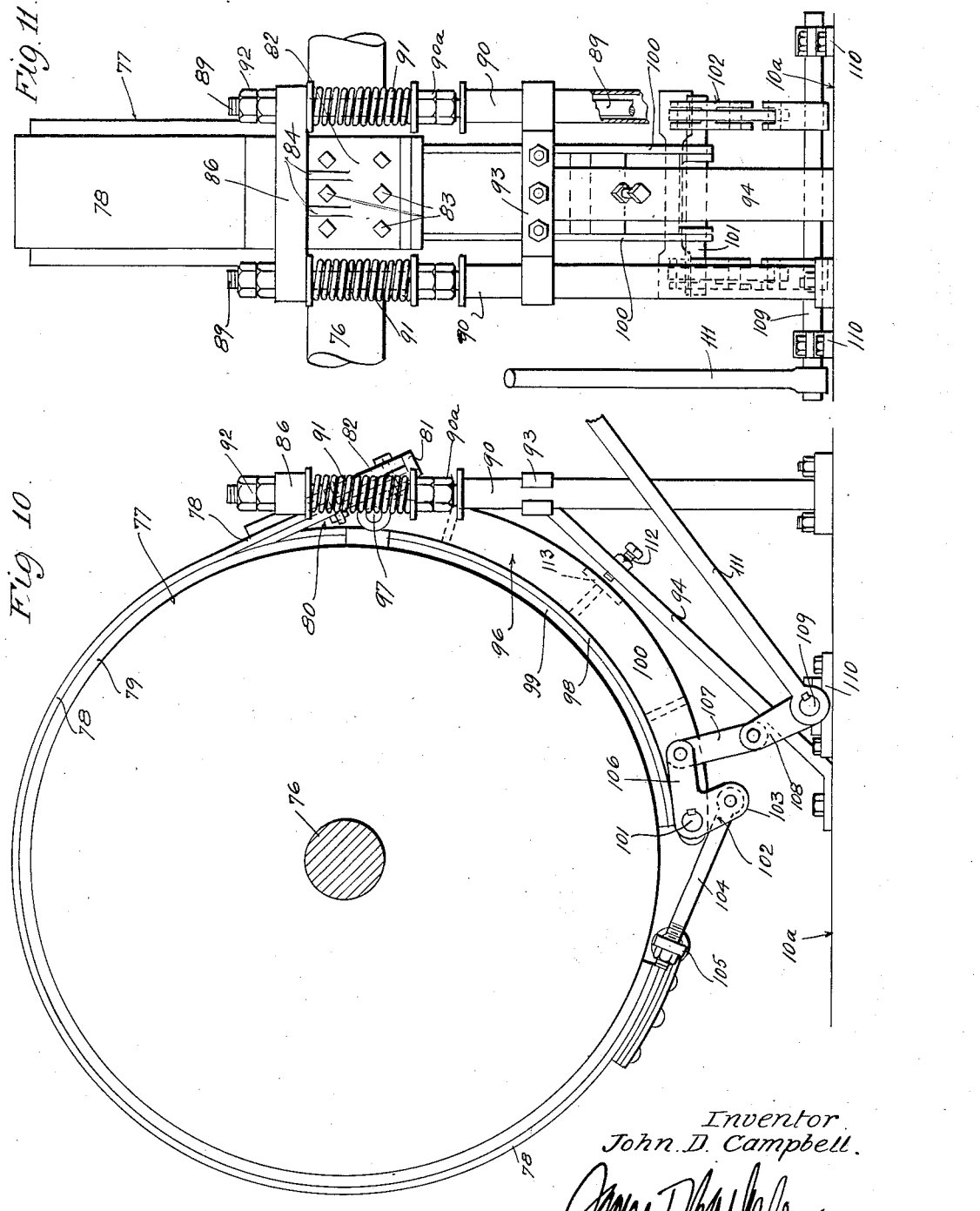
Inventor
John D. Campbell.
Attorney Patented July 30, 1935

2,009,574

UNITED STATES PATENT OFFICE 2,009,574

ROTARY DRUM BRAKE

John D. Campbell, Tustin, Calif., assignor to Jay-Dee Manufacturing Co., Ltd., Tustin, Calif., a corporation of California Application April 25, 1930, Serial No. 447,223

18 Claims. (Cl. 188—77)

This invention relates generally to braking mechanisms, and more particularly to drum and band brakes of the type applied to winding reels in oil well drilling. The brake is described with the application to winding reels in particular view, although it will be understood that the invention is applicable to various other situations where brakes of the drum and band type are used.

Heretofore it has been common to anchor one end of the brake band to the floor, and to connect the other end of the band to the crank of a brake lever, which is also mounted on the floor. This arrangement is disadvantageous because of permitting the give of the floor to influence the operation of the brake, and for the further reason of causing a sharp and dangerous back kick of the brake lever when the band moves with a sudden rotation of the drum at pick up of load, the last effect being due to a sudden pull of the band against the brake lever crank before the band can be freed of the drum.

It is therefore an object of my invention, in one aspect, to provide a brake in which the contracting elements are free of the floor or other similar support.

It is a further object of my invention to provide a brake in which all dangerous back kick with sudden pick up of load is eliminated.

It is a further object of my invention to provide a braking mechanism of the character described which upon sudden pick up of load when the brake is tightly clamped, will permit the band first to have a limited rotation with the drum and then to be released.

It is a further object of my invention to provide a drum and band brake in which a greater length of the drum surface is used in braking than in prior braking mechanisms of the general type to which the present invention appertains.

And it is a further object of my invention to privide a braking mechanism that is of high leverage, is positive in action, both in tightening and in release, and is trustworthy in use, as well as simple in construction.

It is characteristic of my invention, in its preferred form, that there is provided between the brake band ends a connective element or shoe which is anchored to the floor against rotation of itself and the band in one direction, but which is mounted with a capability for movement permitting a limited rotation of the band with the drum in the opposite direction. In the preferred form, all of the brake contracting elements and the operating lever are mounted directly on this band connecting element, so that any movement of the connecting element with the drum upon a sudden pick up of load, for instance, carries the contracting elements and lever bodily along with it until said lever is released, and therefore no back kick can be transmitted to the brake lever by reason of the band being suddenly pulled against it and causing it to swing sharply on its pivot mounting on said connecting element.

These and other features and objects of the invention will appear and be more fully understood from the following detailed description of a present preferred embodiment thereof, reference for this purpose being had to the accompanying drawings, in which:

Figure 1 is a more or less diagrammatic side elevation of a typical draw works showing the application of my improved braking mechanism thereto;

Fig. 2 is a side elevation of the braking mechanism in released position, being a view taken on line 2—2 of Fig. 1;

Fig. 3 is a section taken on line 3—3 of Fig. 1, but showing the mechanism in braking position;

Fig. 4 is a view taken as indicated by lines 4—4 in Fig. 3, parts being removed and broken away to show in section;

Fig. 5 is a fragmentary view of the braking mechanism "kick back" position, parts being shown in section;

Fig. 6 is a fragmentary detail taken as indicated by line 6—6 of Fig. 2;

Fig. 7 is a vertical section taken on line 7—7 of Fig. 3;

Fig. 8 is a horizontal section taken on line 8—8 of Fig. 3;

Fig. 9 is a vertical section taken on line 9—9 of Fig. 4;

Fig. 10 is a side elevation of another form of brake according to my invention; and Fig. 11 is an end elevation of the brake shown in Fig. 10.

Referring now to the drawings, and particularly to Fig. 1, the numeral 10 designates derrick flooring, and the numeral 11 a draw works supported thereon. The draw works includes upright supports 12 journalling a horizontal shaft 13, and fixed on shaft 13 is a winding reel 15 having brake drums 16. Shaft 13 is shown driven through a clutch 17 by means of a sprocket 18 and driving chain 19.

Around each brake drum 16 is a band 20 having a lining 21. One end of the brake band is laid over the straight outer face of an anchor 22, the lower end of the band coming against a toe 22a extending outwardly from anchor 22. An anchor plate 24 comes against the outer surface of the band end, its lower edge also coming against the anchor toe 22a, and bolts 25 and 26 hold the band securely between plate 24 and anchor 22.

The inner surface of anchor 22 conforms to the curvature of the brake drum, and the lower end of the lining 21 is separated from the band at the upper pointed end 22b of the anchor and is carried by the inner surface of the anchor to engage the surface of the drum when the brake is tightened. In this respect the anchor 22 functions as a filler lug between the band end and the lining end.

The upper portion of plate 24 may be of increased cross section for strength, as shown in Fig. 3, and is furnished at each horizontal edge with a perforated lug 28, and through each of the lugs 28 loosely passes the upper end of an anchor pin 29. The lower end of each pin 29 has an eye 30 that is taken within a rectangular aperture 31 provided in a base member 32 fixed to the floor, as by means of screws 33, the pin 29 being pivotally mounted upon a horizontal pin 34 passing through its eye 30 and fixed in the base member 32. The pivot mountings of pins 29 are such that the pins can swing toward and away from the brake drum, as will clearly be understood from the drawings, the capability for such movement being provided for a purpose appearing hereinafter. Surrounding each pin 29 below lug 28 is a sleeve 36 having intermediate its ends a downwardly facing shoulder 37, and confined on pin 29 between this shoulder and the upper surface of base member 32 is a coil spring 38 that tends to move sleeve 36 and the lug 28 of the band-holding plate 34 upwardly on pin 29. Nuts 39 screwed on the upper ends of pins 29 limit the upward movement of sleeves 36 and lugs 28 on the pins due to the upward force of springs 38, the nuts being so adjusted, however, that the lugs 28 and sleeves 36 can have a limited downward movement on the pins 29 by compression of springs 38, as will be clearly understood from reference to Figs. 2 and 5. It will be recognized from an inspection of the drawings that the springs 38, which are under some normal compression in the upper position of the parts (Fig. 2), yieldingly act to hold the pins 29 in upright position.

This end of the brake band is thus anchored to the floor through anchor 22, plate 24 and pins 29, the band pulling against the nuts 39 on the upper ends of the pins when the brake is tightened during left handed rotation of the brake drum. The reasons for the movability of lugs 28 on the pins will appear at a later point in the specification.

A brake shoe 35 carrying the contracting mechanism for the brake band is hinged to the lower edge of anchor 22 by means of a pivot pin 35a. Shoe 35 comprises an inner plate 35b conforming to the curvature of the drum and having a drum engageable lining 35c, and spaced side plates 39a between and on which is mounted the brake contracting mechanism.

The other end of band 20 is pivotally connected to the rear end of a bolt 42, on the forward end of which is screw-threaded a nut 43, and loosely surrounding bolt 42 just back of and in engagement with nuts 43 is a plate 44 (see Figs. 4 and 9), this plate having oppositely extending pins 45 trunnioned to the opposite sides 48a of a yoke-like lever member 48 straddling bolt 42 and movably mounted, as later to be described, between the side plates 39a of the shoe. The trunnion mounting of pins 45 includes bearings 50 formed on the opposite sides 48a of yoke 48, and bearing caps 51 fastened down over the trunnion pins by means of screws 52, the right hand bearing cap 51 being removed in Fig. 4. It will be understood that movement of lever 48 to the right, as from the position of Fig. 2 to that of Fig. 3, will cause the plate 44 trunnioned thereto to act against nut 43 and draw bolt 42 to the right to tighten the band. Nut 43' has an annular groove 54 within which is taken a plate 55 fastened to plate 44, as clearly shown in Fig. 9, thus so fixing plate 44 to bolt 42 that movement of the lever 48 back to the left causes the bolt to be moved to the left to release or expand the band.

The upper end of lever 48 is pivoted by means of a pin 59 to the outer end of an arm 60, which arm is pivoted at its inner end upon a pin 61 fixed between the side walls 39a of the shoe. The lower end of each side 48a of the yoke-like lever 48 is pivoted by means of a pin 63 to the outer end of an arm 64 which is keyed to a rock shaft 65, shaft 65 being journalled in the side plates 39 of the shoe. In cases where two laterally spaced brakes are used, as illustrated in Fig. 1, a single rock shaft 65 will be used for the two shoes. If desired a flexible coupling, indicated in Fig. 1 at 65a, may be placed in shaft 65 between the two brakes to absorb differences in movement between the two shoes. Mounted on shaft 65 is an operating lever for the brake, it being apparent that operation of lever 66 simultaneously works both sets of braking mechanisms.

It will be noted that the band engages the drum for three-quarters of the circumference thereof, and since it has but the single anchor, connected near its end, is fully "self-energizing", thus giving the maximum efficiency for a wrap around band brake, while the space between the band ends is taken up by a positively applied brake shoe, adding materially to the braking effort.

In Fig. 2 the brake is shown in released position, the band clearing the drum on all sides. Fig. 3 shows the mechanism moved to braking position, operating lever 66 having been moved to the right to rock shaft 65 right handedly and thereby to swing arm 64 of the contracting mechanism from the upright position of Fig. 2 toward the right, as in Fig. 3, and lever 48 accordingly having been swung toward the right and down, with arm 60 moved downwardly, as shown. Lever 48 by this movement acts through plate 44 against the nut 43 on bolt 42 to draw bolt 42 toward the right, thereby drawing together the lower end of the brake band and the shoe. And since the upper end of the shoe is connected to the anchor 22 to which the upper end of the brake band is connected, this operation contracts the band tightly around the drum, while shoe 35 pivots inwardly on pin 35a until it also engages the drum. It is to be noted that the leverage of the contracting elements increases as the brake is tightened due to arm 64 approaching a position at right angles to lever 48, thus giving large movement of the band and low leverage of the contracting elements as the band is first moved from released position, and small movement and high leverage as the band is finally tightened about the drum.

While I have now described in detail the arrangement and operation of preferred band contracting elements it will be understood that any other band contracting elements may be employed without departing from the scope of the broader claims appended hereto.

As the brake band is tightened, in the manner above described, the anchoring rods 29 rock slightly toward the drum to permit the anchor 22 and shoe 35 to move in to engage the drum, the amount of such movement of the upper ends of pins 29 being indicated at d in Figs. 3 and 5. When the brake is released the springs 38 act to move the pins 29 back to the upright position, thereby clearing anchor 22 from the drum, as clearly shown in Fig. 2.

The pins 29 have a loose fit through the lugs 28 of the anchor plate 24 to accommodate the slight inward movement of anchor 22 as it moves from the released position of Fig. 3 to the contracted position of Fig. 5.

In typical operation, the drum may rotate left handedly, as viewed in Fig. 2, in paying out a cable C reeled on the winding drum 15, the brake being actuated (Fig. 3) to regulate the rate of paying out or to stop and hold the cable, it being understood that the load on the cable may be very great and the brakes will accordingly be very tightly held. When it is desired to rewind the cable, the clutch 17 is engaged and shaft 13 and drum 15 driven through sprocket 18. Now when clutch 17 is thus engaged, the brake drums, around which the bands are still tightly clamped, are immediately and suddenly rotated toward the right, and the bands, being freely bodily rotatable right handedly from the position of Fig. 3, except for the yielding restraint of springs 38, are carried for a short distance with the drum before they can be freed therefrom by release of the lever. Now if the brake operating lever were to be mounted on the floor, as in past practice, the forwardly moving band would cause a sharp and dangerous back kick to be given to the operating lever before the band could be released from the drum, as is well known in the art from practical experience. And this back kick is not simply the motion of the band with the drum as the drum starts to rotate, but is that motion multiplied by the leverage ratio of the operating lever to the band. In the present case, however, the brake lever is fulcrumed on the brake band connecting element or shoe itself, and is therefore free to rotate bodily with the band, which it does until the band is freed of the drum. The lever thus has, in such movement, no fulcrumal movement whatever, and the bodily movement which it does have is not magnified through the mechanical advantage ratio of the lever. This right handed movement of the band and shoe takes place, in the present form of the brake, against the springs 38 surrounding the anchor pins 29, the brake band anchor 22 moving plate 24 and sleeves 36 downwardly against the springs to a position, for instance as shown in Fig. 5, where the drum finally breaks from the band. Thus as the clutch is engaged and the drum starts to rotate to pick up the load, the tightly clamped band rotates with the drum for a short distance against the force of the springs 38 until the band can be released; and since the fulcrum of the operating lever moves with the band in such movement, no back kick can be imparted to the lever. The primary function of springs 38 in this connection, however, is merely to return the band from the position of Fig. 5 to that of Fig. 2, rather than to oppose movement of the band in its release action in the reverse direction, from the position of Fig. 3 to that of Fig. 5. Thus as far as the latter action is concerned the springs might be omitted, the inertia of the parts being relied upon to take up any shock. The springs do have a secondary function in the latter movement, however, in that they yieldingly oppose movement of the anchored end of the band and so aid in release of the band.

As the operating lever is moved back to the position of Fig. 2 to release the brake, the plate 55 that engages the annular groove of nut 43 (see Fig. 9) moves bolt 42 to the left to loosen the band, whereupon the springs 38 act to swing the anchor pins 29 back to the upright position to clear the anchor 22 and shoe 35 of the drum. The shoe 35 being thus released, swings rearwardly until it meets a stop screw 70 carried by the base member 32, as clearly shown in Fig. 2.

Figs. 10 and 11 show another form of brake having certain characteristics in common with the brake previously described, this mechanism also being designed to eliminate back kick of the operating lever. In Figs. 10 and 11 derrick flooring is indicated at 10a, the drum shaft at 76 and the brake drum at 77. The brake band 78 which has a lining 79, is laid at one end over the outer face of the anchor 80, its lower end coming against an outwardly extending toe 81 of the anchor, as in the other embodiment. Over the end of band 78 opposite anchor 80 is then placed the anchor plate 82, screws 83 serving to clamp the anchor, band, and anchor plate together. The inner surface of the anchor 80 conforms, as before, to the curvature of the brake drum and carries the end of the lining 79.

Welded to plate 82 and braced thereon by means of webs 84 is a cross bar 86 through the perforated ends of which pass the upper ends of anchor rods 89 extending upwardly from suitable floor mountings. Rods 89 are surrounded by tubes 90, and surrounding pins 89 between nuts 90a thereon and cross bar 86 are compression springs 91, nuts 90a holding the springs 91 up against the downwardly moving bar 86 when the brake band tends to move right handedly with the drum, as previously described in connection with the other embodiments, and nuts 92 on the upper ends of pins 89 limiting the upward movement of bar 86. The nuts 90a clear the upper ends of the tubes 90, and the pins 89 are free to bend slightly toward the drum, as the brake band is contracted, so that the anchor and shoe come against the drum, the resiliency of the pins causing them to spring back to an upright position to clear the band of the drum when the band is released. Tubes 90 may be braced by means of a cross-strap 93, which in turn is rigidly braced from the floor by means of a channel support 94.

Shoe 96 is pivoted at 97 to anchor 80, and comprises an inner plate 98 curved to conform to the brake drum and having an inner lining 99, and flange plates 100 braced by webs 100a. Journaled in the lower end of the flanges 100 of shoe 96 is a cross-shaft 101, and mounted on the ends of shaft 101 are bell cranks 102. Each bell-crank 102 has a depending arm 103 to the end of which is pivotally connected a link 104, the rear end of links 104 connecting to the opposite ends of a cross-bar 105 which is connected to the other end of brake band 78. The other arms 106 of the bell-cranks extend in a direction substantially at right angles to the radius of the drum, and pivoted to the end of each arm 106 is one arm 107 of a toggle, the other arm 108 of which is keyed on a rock shaft 109 supported in suitable floor bearings 110. Also keyed on shaft 109 is the operating lever 111. It will be obvious that downward movement of operating lever 111 causes the toggle 107, 108 to move bell-crank arm 106 upwardly, which causes the other bell-crank arm 103 to pull to the right on link 104 to tighten the brake band on the drum. Attention is particularly called to the fact that the brake contracting elements are arranged with the toggle arm 107 that operates bell-crank 102 extending in a normal direction substantially radial to the brake drum when the elements are in contracted position, as clearly shown in Fig. 10. By reason of this arrangement, should the brake band move right handedly with the drum with sudden pickup of load, the movement of shoe 96 will simply cause the connecting arm or link 107 to pivot with reference to the arm 108, and little or no movement will be imparted to arm 108 to be transmitted to the operating lever. And this important result, it will be noted, is by virtue of the provision of the pivoted motion transmitting link extending substantially radial to the drum.

When the brake is released, shoe 96 swings rearwardly on its pivot 97 to release the drum, and to limit such movement the channel brace 94 is provided with a stop screw 112 adapted to engage a cross strap 113 of the shoe.

While I have now illustrated and described certain specific means for carrying out embodiments of my invention, it will be obvious that various changes in design, structure and arrangement may be effected without departing from the spirit and scope of my invention, and it is therefore to be understood that all such changes are contemplated within the scope of my invention as expressed in the following claims.

I claim:

1. A brake embodying the combination of a drum and a band with two ends, a brake shoe flexibly connected to one end of said band, band contracting means mounted solely on said brake shoe and connected to the other end of said band, and anchoring means applied to the band near its flexible connection with the brake shoe, said anchoring means yielding resiliently to permit limited rotation in one direction of the band with the drum.

2. A brake embodying the combination of a drum and a band with two ends, a brake shoe connected to one end of said band, band contracting means mounted exclusively on said brake shoe and connected to the other end of said band, said means including a link connected at one end to the brake end, a lever to which the other end of said link is pivoted, an arm pivoted to the brake shoe and pivotally carrying one end of said lever, a rock shaft mounted on the brake shoe, an arm on said rock shaft and pivotally carrying the other end of said lever, and an operating lever on the rock shaft; an anchoring means for the brake band.

3. In a brake, the combination of a drum, a brake band encircling said drum, a pivoted anchor for the band, resilient means supporting the anchor in predetermined alinement and resisting pivotal displacement therefrom, a straight end portion of the band extending tangentially to its drum surrounding portion and being connected with the anchor and extending at an angle to the normal alinement of the anchor whereby the anchor rocks on its pivotal mounting toward the drum when the band is contracted and returns upon release of the band to its initial position to clear the band end from the drum.

4. In a brake, the combination of a drum, a brake band encircling said drum, a pivoted anchor yieldingly supported in predetermined alinement, a straight end portion of the band extending tangentially to its drum surrounding portion and being connected with the anchor and extending at an angle to the normal alinement of the anchor, a filler member between the straight part of the band and the drum, said filler member having an inner face curved in conformation to the curvature of the drum, and a lining laid inside the curved band and inside the curved face of the filler member.

5. In a brake the combination of a drum and a band with two ends, a brake shoe mounted flexibly on one end of the band, means for changing the relative positions of the band ends to contract and expand the band around the drum, said means being mounted on said brake shoe so that movement of the shoe around the drum does not affect the operation of said means, and anchoring means for the band resiliently opposing rotation of the band with the drum in one direction, said means being the sole mounting for the band whereby except for the yieldable restraint of said mounting the band is free to move bodily with the drum.

6. In a brake the combination of a drum and a band with two ends, means anchoring one end of the band rigidly against rotation of the band with the drum in one direction and resiliently yieldable to permit limited rotation of the band with the drum in the other direction, said anchoring means being the sole mounting of the band whereby except for the restraint of said mounting the band is free to move bodily with the drum, a brake shoe mounted flexibly solely on the anchored end of the band, and brake contracting elements mounted solely on said brake shoe and operatively connected to the other end of said band, whereby movement of the band and shoe bodily around the drum does not affect operation of said brake contracting elements.

7. In a brake the combination of a drum and a band with two ends, a brake shoe mounted flexibly on one end of the band, means anchoring one end of the band rigidly against rotation of the band with the drum in one direction and resiliently yieldable to permit limited rotation of the band with the drum in the other direction, said anchoring means being the sole mounting of the band whereby except for the restraint of said mounting the band is free to move bodily with the drum, a brake shoe mounted flexibly solely on the anchored end of the band, and brake contracting elements mounted on said brake shoe so that bodily movement of the band and shoe around the drum does not cause operation of said contracting elements.

8. A brake embodying the combination of a drum and a band with two ends, an anchor to which one end of the band is secured, a connective element connected to said anchor, band contracting means mounted on said connective element and connected to the other end of the band, an anchor pin mounted independently of the band and on which said anchor is arranged to slide, stop means associated with said anchor pin positively limiting movement of the anchor with the band and drum in rotative movement in one direction, and a spring associated with said anchor pin and resiliently yieldable to permit limited rotation of the anchor with the band and drum in rotative movement in the opposite direction, said anchor pin, stop means and spring being the sole mounting of said anchor whereby the anchor is otherwise free to move bodily with the band and drum when the brake is contracted.

9. A brake embodying the combination of a drum and a band with two ends, an anchor to which one end of the band is secured, a connective element connected to said anchor, band contracting means mounted on said connective element and connected to the other end of the band, an anchor pin mounted independently of the band and on which said anchor is arranged to slide, said anchor pin mounted to swing towards and away from the drum during sliding movement of the anchor thereon, stop means associated with said anchor pin positively limiting movement of the anchor with the band and drum in rotative movement in one direction, and a spring associated with said anchor pin and resiliently yieldable to permit limited rotation of the anchor with the band and drum in rotative movement in the opposite direction, said anchor pin, stop means and spring being the sole mounting of said anchor whereby the anchor is otherwise free to move bodily with the band and drum when the brake is contracted.

10. A brake embodying the combination of a drum and a band with two ends, an anchor to which one end of the band is secured, a connective element connected to said anchor, band contracting means mounted on said connective element and connected to the other end of the band, an anchor pin mounted independently of the band and on which said anchor is arranged to slide, said anchor pin mounted pivotally so as to swing towards and away from the drum during sliding movement of the anchor thereon, stop means associated with the anchor pin positively limiting movement of the anchor with the band and drum in rotative movement in one direction, and a spring surrounding said anchor pin, said spring resiliently opposing rotation of the anchor with the band and drum in rotative movement in the opposite direction, and said spring also serving to return said pivotally mounted anchor pin to a normal retracted position when the brake contracting means are released.

11. A brake embodying a constrictable band assembly comprising a drum encircling band and band constricting means mounted exclusively on the band, and a single band anchoring means adapted to support the band against rotation with the drum beyond a normal inactive limiting position in one direction of drum rotation and to allow limited bodily rotation of the band with the drum from said limiting position in the other direction of drum rotation, the band assembly being otherwise free to rotate bodily with the drum.

12. A brake embodying a constrictable band assembly comprising a drum encircling band and band constricting means mounted exclusively on the band, and a single band anchoring means adapted to support the band at a point near one end thereof against rotation with the drum beyond a normal inactive limiting position in one direction of drum rotation and to allow limited bodily rotation of the band with the drum from said limiting position in the other direction of drum rotation, the band assembly being otherwise free to rotate bodily with the drum.

13. A brake embodying a constrictable band assembly consisting of a drum encircling band, a drum engageable shoe connected to one end of said band, and band constricting means connected to the other end of said band, said band constricting means mounted exclusively on said shoe, and a single anchoring means for the band supporting it at the shoe-connected end of the band and adapted to allow limited bodily rotation of the band in one direction with the drum, the band assembly being otherwise free to rotate bodily with the drum.

14. A brake embodying a constrictable band assembly consisting of a drum encircling band, a drum engageable shoe connected to one end of said band, and band constricting means connected to the other end of said band, said band constricting means mounted exclusively on said shoe, and a single anchoring means for the band supporting it at the shoe-connected end of the band adapted to hold the band against rotation with the drum beyond a normal inactive limiting position in one direction of drum rotation and to allow limited bodily rotation of the band with the drum from said limiting position in the other direction of drum rotation, the band assembly being otherwise free to rotate bodily with the drum.

15. A brake embodying a constrictable band assembly comprising a drum encircling band and band constricting means mounted exclusively on the band, and a single band anchoring means adapted to allow limited bodily rotation of the band with the drum from a normal inactive band position, the band assembly being otherwise free to rotate bodily with the drum.

16. In a brake, the combination of a drum and a band with two ends, a brake shoe mounted flexibly on one end of the band, means for changing the relative positions of the band ends to contract and expand the band around the drum, said means being mounted on said brake shoe so that movement of the shoe around the drum does not affect the operation of said means, and anchoring means for the band adapted to hold the band rigidly against rotation with the drum in one direction beyond a given position and adapted to permit limited rotation of the band with the drum from said position in the opposite direction.

17. In a brake, the combination of a drum and a band with two ends, means anchoring one end of the band rigidly against rotation of the band with the drum in one direction beyond a given position and adapted to permit limited rotation of the band with the drum from said position in the opposite direction, said anchoring means being the sole mounting of the band whereby except for restraint of said mounting the band is free to move bodily with the drum, a brake shoe mounted flexibly on the anchored end of the band, and brake contracting elements mounted solely on said brake shoe and operatively connected to the other end of the band, whereby movement of the band and shoe bodily around the drum does not affect operation of said brake contracting elements.

18. In a brake, the combination of a drum and a band with two ends, a brake shoe mounted flexibly on one end of the band, means anchoring one end of the band rigidly against rotation of the band with the drum in one direction beyond a given position and adapted to permit limited rotation of the band with the drum from said position in the opposite direction, said anchoring means being the sole mounting of the band whereby except for the restraint of said mounting the band is free to move bodily with the drum, a brake shoe mounted flexibly on the anchored end of the band, in such manner that bodily movement of the band and shoe around the drum does not cause operation of said contracting elements.

JOHN D. CAMPBELL.